No. 800,979. PATENTED OCT. 3, 1905.
D. T. BRYAN & O. SADLER.
CHEESE CUTTER.
APPLICATION FILED APR. 25, 1905.
2 SHEETS—SHEET 1.
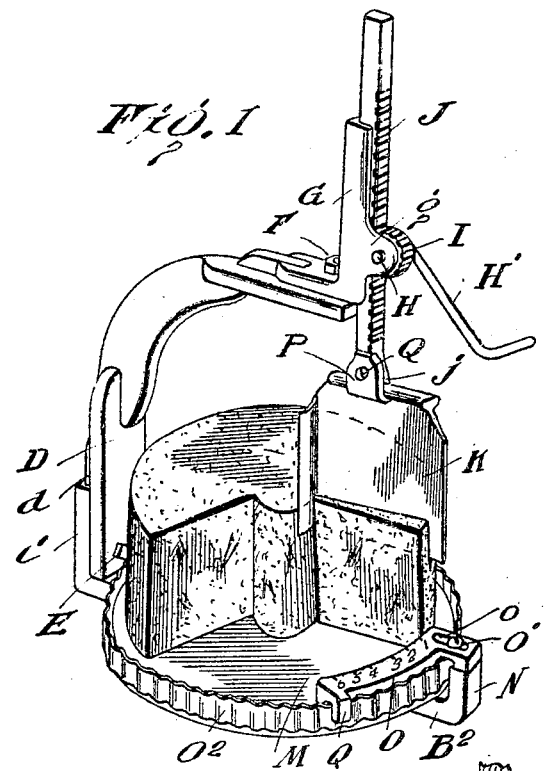
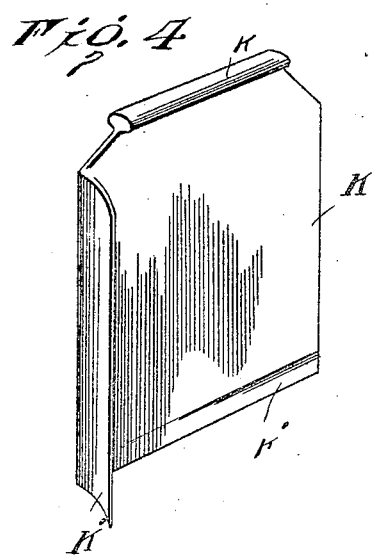
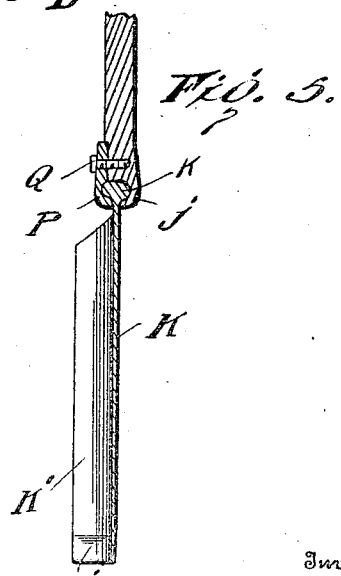
Witnesses
E. R. Wright, Jr.
E. R. Peck
Inventors
D. T. Bryan
O. Sadler
By A. J. Pattison, Attorney

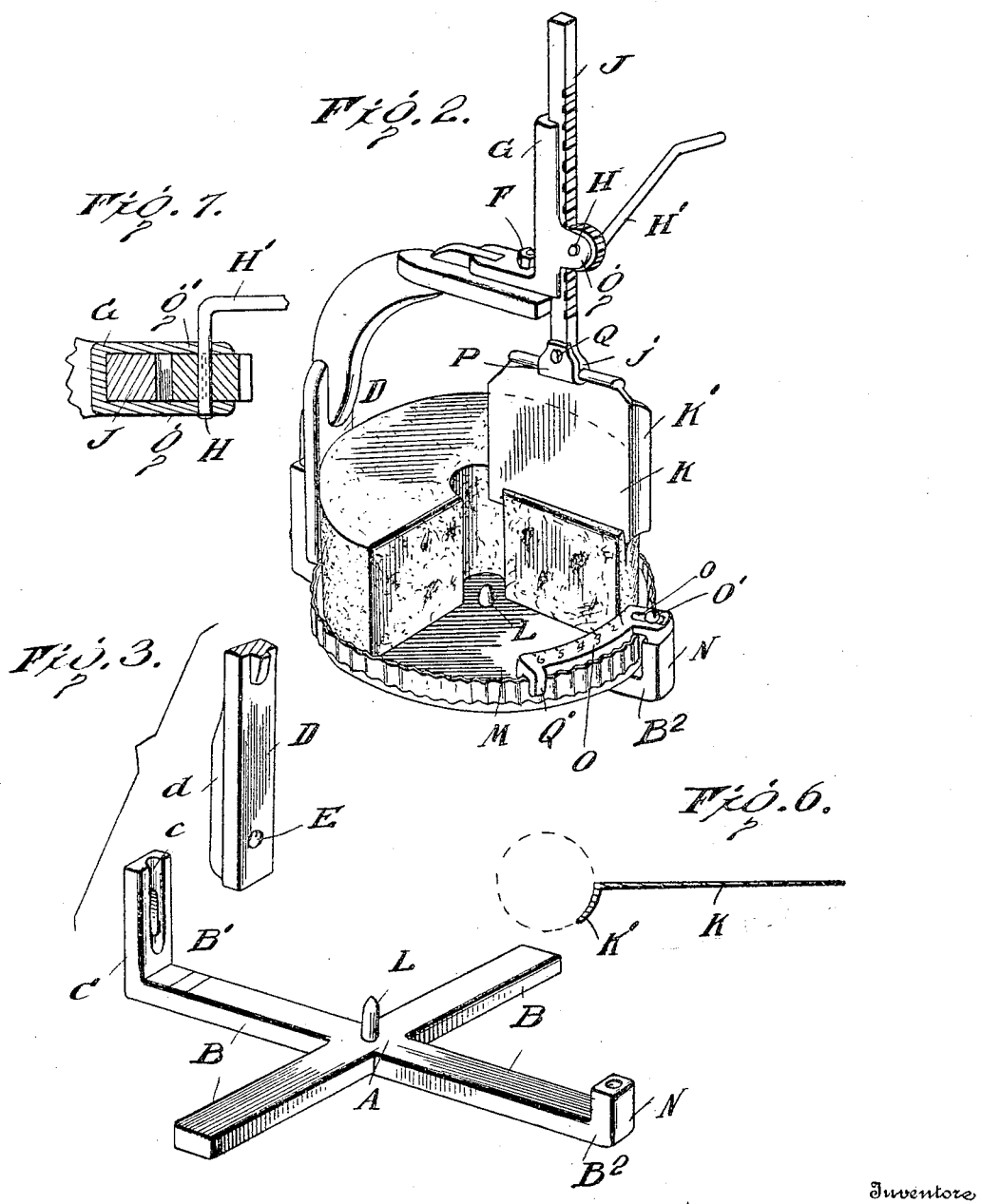

UNITED STATES PATENT OFFICE.

DEMPSEY T. BRYAN AND OCTAVIUS SADLER, OF ROCKYMOUNT, NORTH CAROLINA.

CHEESE-CUTTER.

No. 800,979. Specification of Letters Patent. Patented Oct. 3, 1905.

Application filed April 25, 1905. Serial No. 257,321.

*To all whom it may concern:*

Be it known that we, DEMPSEY T. BRYAN and OCTAVIUS SADLER, citizens of the United States, residing at Rockymount, in the county of Edgecombe and State of North Carolina, have invented certain new and useful Improvements in Cheese-Cutters, of which the following is a specification, reference being had therein to the accompanying drawings.

Our invention relates to improvements in cheese-cutters, and pertains particularly to that class in which the desired amount of cheese is readily cut.

The object of our invention is to provide a cutter of this character in which the knife is vertically movable above the cheese and so arranged and constructed that there will be a core left at the center of the cheese, and thus avoid the cutting of the inner edge of the slice of cheese to a knife-edge.

Another object of our invention is to provide a device of this character in which cheeses of different diameter and thickness may be readily placed upon the cutter and cut in precisely the same manner and at the same time avoiding the removal or disturbing of any part in inserting the cheese.

In the accompanying drawings, Figure 1 is a perspective view of our improved cutter, showing a cheese thereon and partly cut away by our improved cutter and showing the core left at the center. Fig. 2 is a perspective view of our improved cutter, showing a cheese thereon having the core cut therefrom and the blade reversed with the laterally-turned portion at the outer periphery of the cheese. Fig. 3 is a perspective view of the supporting-base with the rotatable cheese-supporting member removed. Fig. 4 is a perspective view of the cutting-blade removed. Fig. 5 is a vertical sectional view of the blades and the adjustable means for holding the same. Fig. 6 is a horizontal sectional view of the blade, showing the laterally-turned end. Fig. 7 is a transverse sectional view showing the arrangement of the gear and rack-bar within the slide.

Referring now to the drawings, A represents a base which, as shown, is in the form of radially-extending arms B, which are adapted to rest upon the counter and be secured thereto in any desired manner, as this forms no part of our invention. The radially-extending arm B' is provided with an upwardly-extending standard C, which, as shown, has secured thereto an upwardly-extending curved arm D, which is provided with a laterally-extending elongated fin $d$, which enters an elongated recess $c$ and prevents the curved arm from twisting on the standard. Passing through the arm D and through the recess $c$ in the standard is a bolt E, which firmly clamps the arm to the standard and allows the vertical adjustment of the same on the standard. The upper and outer end of the arm D above the center of the base has bolted thereto by means of the bolt F the vertically-disposed slide G, which is provided with the outwardly-extending oppositely-arranged ears $g$ and $g'$. The outer ends of the ears have a bolt H passing loosely therethrough and have rigidly mounted thereon between the ears the pinion I, and one end of said bolt carries a crank H', by means of which the pinion is rotated. Between said ears and between the pinion and the slide G is a vertically-disposed rack-bar J, with which the pinion I meshes and by means of which the rack-bar is raised and lowered as desired. The lower end of said rack-bar has secured thereto the knife K, and said connection between the knife and rack-bar is such that the knife can be horizontally adjusted, so that the blade can be moved in or out toward or from the center of the cheese for making the core larger or smaller. This connection consists in the blade having a rib $k$ at its upper edge and the lower end of the rack-bar provided at one side with the downwardly-extending portion $j$, and clamped to the opposite side of the bar is a clamping member P, which is bolted to the rack-bar by the bolt Q and the two parts having oppositely-arranged grooves adapted to receive the rib $k$, and thus firmly hold the same therein in its adjusted position.

The base A at the intersection of the radially-extending arms is provided with an upwardly-extending stud L, which passes through a circular cheese-supporting table M, which, as shown, is made of wood and is adapted to rotate around said stud for bringing the cheese under the knife at the desired point. The radially-extending arm $B^2$ is provided with an upwardly-extending stud N, which has secured thereto a segmentally-arranged gage O, which extends inwardly over the table M, the said table being of such a size as to support the cheese and have the gage on the out-side of the cheese, and thus the cut edge of the cheese is brought at the desired point on the gage, and the amount of cheese to be cut is readily determined. The connection of the gage with the stud N is by an elongated slot o in the gage, and the bolt O' passes through the same and enters the stud. Thus the gage can be moved in or out to bring the same adjacent the outer periphery of the cheese when different-size cheese are placed thereon. The outer edge of the table is provided with an upwardly-extending ledge O², which prevents the small particles of cheese from falling from the table.

The knife K, as shown, is of an elongated form and has a lower cutting edge $k'$, which is adapted to cut the cheese on its downward movement. The said knife is so positioned on the rack-bar in respect to the base that the knife extends from a point a short distance from the center of the cheese radially outward and the knife being of such a width that different-size cheese may be cut. In devices of this character the cheese has been cut from the center radially outward, and thus the inner edge of each cut is at a knife's edge, and the same will likely be broken and a rough edge formed. Our device is adapted to leave a center core, which when the cheese is entirely disposed of will remain and can then be disposed of by selling, as it would doubtless be a number of pounds. In order to sever the inner end of each cut from the core, we provide the blade K with a curved inner end K', which cuts the end of each cut as the blade cuts and leaves a round even core and at the same time forms each cut of the cheese with a smooth thick edge which will not break and form an uneven cut. While we have shown the portion K' curved for cutting a round curved core, the same could be straight and at right angles to the cutting-blade, thus leaving the core of polygonal form. The gage O has its outer free end Q bifurcated and is adapted to fit over the upwardly-extending flange O².

In Fig. 2 the knife K is shown reversed, and the cheese has a core cut therefrom before being placed upon the base and the knife reversed, so that the laterally-turned end is out beyond the outer periphery of the cheese, and it will be readily seen that each cut will have a square end instead of the knife-edge, as heretofore described.

Having thus described our invention, what we claim, and desire to secure by Letters Patent, is—

1. A cheese-cutter, comprising a rotatable base, a cutter above the base and radially arranged, and a laterally-turned end carried by the inner end of said blade.

2. A cheese-cutter, comprising a rotatable base, a cutter above the base, and a laterally-extending cutter carried by the inner end of said blade.

3. A cheese-cutter, comprising a rotatable base, a cutter above the base and radially arranged, and a laterally-extending cutter carried by the inner end of said blade.

4. A cheese-cutter, comprising a base, a cutter above the base and having a laterally-turned cutter edge.

5. A cheese-cutter, comprising a base, and a radially-arranged cutter having a laterally-turned inner cutting edge.

6. A cheese-cutter, comprising a base, a cutter vertically movable above the base and radially arranged, and having a laterally-turned inner cutting edge.

7. A cheese-cutter, comprising a rotatable base, a cutter vertically movable above the base and radially arranged, a gage carried by the base for determining the amount of cheese to be cut, and a laterally-arranged cutting edge carried by the inner end of the said blade.

8. A cheese-cutter, comprising a supporting-base, a cheese-supporting table rotatably mounted upon said base, a gage carried by the base and extending over the cheese-supporting table, a vertically-movable knife above the cheese-table, and a laterally-extending cutting edge carried by the inner edge of the knife.

9. A cheese-cutter, comprising a base, a cheese-supporting table rotatably mounted upon said base, a gage carried by the base extending over the cheese-support, an upwardly-extending arm vertically adjustable upon the base, a knife vertically movable within the upper end of said arm, and said knife having a laterally-turned end carried by its inner edge.

10. A cheese-cutter, comprising a base, a cheese-support rotatably mounted upon the base, a gage carried by the base and extending over the cheese-support, an upwardly-extending vertically-adjustable arm carried by the base, ears carried by the upper end of said arm, a gear rotatably mounted between said ears, means for rotating the gear, a rack-bar between the gear and the said arm and in mesh with the gear, a knife carried by the lower end of said rack-bar, and a laterally-extending cutting edge carried by the inner end of the knife, and a radially-adjustable gage carried by the base and extending over the cheese-support.

11. A cheese-cutter, comprising a rotatable base, a cutter above said base and having a laterally-turned inner cutting edge, and means for adjusting said cutter radially.

In testimony whereof we affix our signatures in presence of two witnesses.

DEMPSEY T. BRYAN.
OCTAVIUS SADLER.

Witnesses:
ANNIE F. SADLER,
HERVEY W. PARHAM.